United States Patent

[11] 3,581,215

[72] Inventor Forrest C. Meyer
 San Diego, Calif.
[21] Appl. No. 826,839
[22] Filed May 22, 1969
[45] Patented May 25, 1971
[73] Assignee Assignor to Systems Peripherals
 Division, San Diego, Calif.

[54] VARIABLE FREQUENCY DELAY LINE DIFFERENTIATOR
 10 Claims, 6 Drawing Figs.

[52] U.S. Cl.................................................... 328/56,
 307/229, 307/235, 307/293, 328/127, 330/30,
 340/174.1
[51] Int. Cl...................................................... H03k 5/159

[50] Field of Search.......................................... 307/229,
 235, 293; 328/56, 127, 146—149, 150; 330/30
 (D); 340/174.1; 333/19

[56] References Cited
 UNITED STATES PATENTS
 3,164,815 1/1965 Applequist.................... 340/174.1
 3,444,473 5/1969 Sherman........................ 330/30

*Primary Examiner*—Stanley D. Miller, Jr.
*Attorney*—Smyth, Roston and Pavitt

ABSTRACT: A circuit for processing a transducer readout signal is disclosed in which a frequency dependent variable length delay line is connected across a double ended output of a signal amplifier.

PATENTED MAY 25 1971
3,581,215
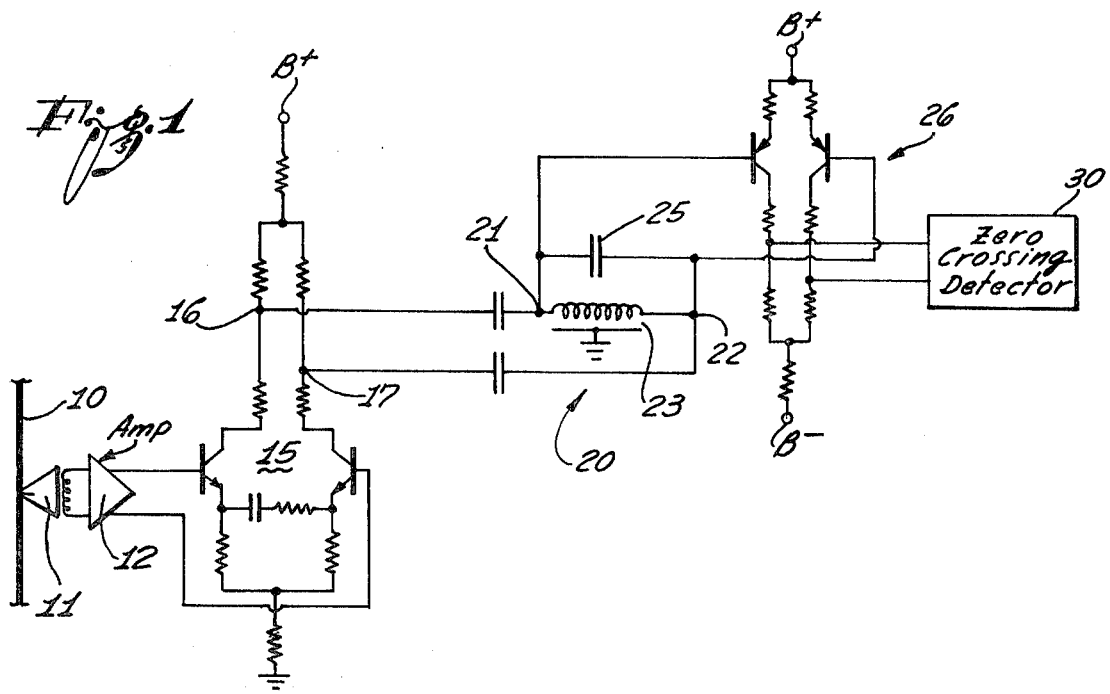
Fig. 1
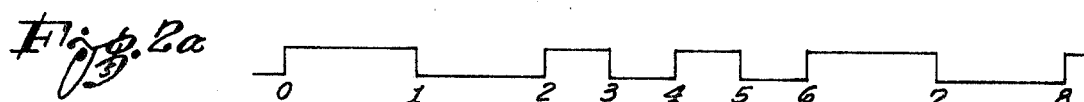
Fig. 2a
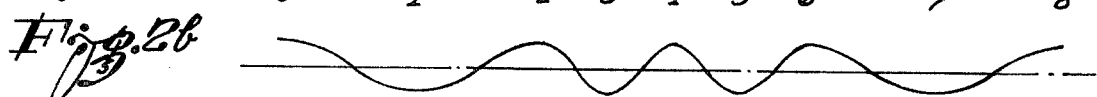
Fig. 2b
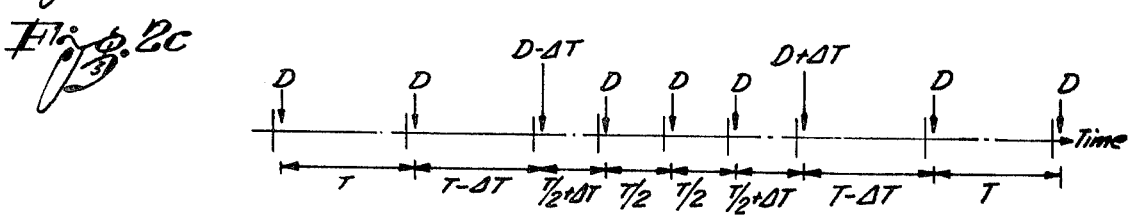
Fig. 2c
Fig. 2d
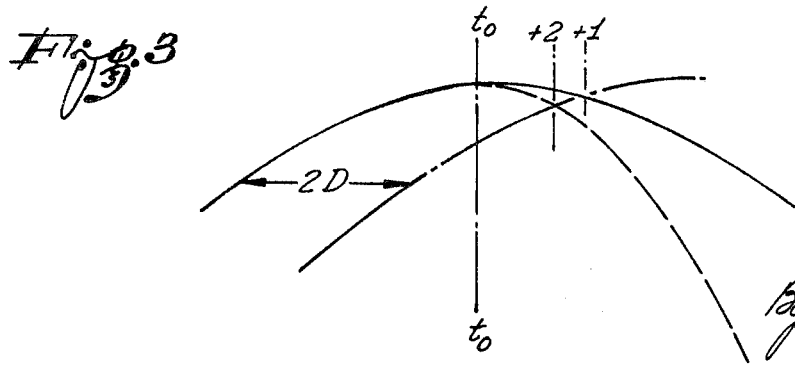
Fig. 3
INVENTOR:
Forrest C. Mayer
By Smyth, Roston & Pavitt
Attorneys

VARIABLE FREQUENCY DELAY LINE DIFFERENTIATOR

The present invention relates to improvements in delay line differentiating circuits. The invention will find particular utility in differentiating circuits employed in circuit for processing signals which have been read from a magnetic recording surface.

Differentiating circuits are used as components in readout signal processing circuits connected to transducers reading a magnetic storage surface. Particularly in case digital data are recorded on such surface, differentiation of the transducer output is used as part of the decoding process. Digital data are recorded on magnetic storage surfaces such that the magnetic flux changes direction in places along the data track. The location and occurrence of such flux reversal or transition is of digital significance. Moreover, for some digital recording formats the spacing between sequential transitions along the data track is of bit value and/or bit rate defining or establishing significance.

As such a flux direction change on the surface passes a read or reproduce transducer, a voltage peak is induced in the output circuit of the transducer. Sequential voltage peaks represent sequential passage of two transitions. Peak detection by amplitude strobing has been used in the past for reproducing the occurrence of a transition. However, amplitude discrimination of the readout signal for such purpose is very difficult in case of high noise spikes. Instead, it has been suggested to differentiate the transducer output signal. The differentiated signal passes through zero when the transducer output voltage is at a peak value. Thus, the time a magnetic flux reversal on the record carrier has passed the transducer can be detected by detecting the time of zero crossing of the differentiated readout signal. A zero crossing detector is, for example, disclosed in my copending application Ser. No. 809,586 filed Mar. 24, 1969.

For high data densities, i.e., high densities of such flux reversals on the recording surface, the output signal frequencies are high, as the peaks occur in rapid succession, so will the zero crossings of the differentiated signal. As the occurrence of such transition (and of the readout peak and of a zero crossing) is of significance as far as overall reproduction of the digital recording is concerned, accurate timing of sequential zero crossings of the differentiated readout signal is of critical importance.

If the magnetic storage surface is of the hard type (drum or disc), the readout signal frequencies are in the megacycle range. Therefore, a fast response of the differentiating circuits is mandatory. The transducer output signal itself is a rather low voltage signal so that with conventional differentiation techniques for the transducer output signal, such as RC circuits, there is, however, a considerable loss in gain; the correspondingly required high amplification of the differentiated signal introduces considerable noise into the signal processing before the occurrence of the critical event of interest, i.e., the zero crossing, has been detected. Such "noise amplification" therefore, tends to distort the reproduction process.

In accordance with the preferred embodiment of the present invention, signal is, therefore, suggested to employ a frequency selective variable length delay line as differentiating element. This frequency selective variable length delay line is connected across two terminals between which an amplifier attempts to develop an amplified replica of the transducer output signal to be differentiated. The differentiated signal will be taken from these terminals.

Delay line differentiation, per se, has already been suggested for differentiation of transducer output signals. However, the object of the invention is to establish a zero crossing signal which has been derived from, for example, a transducer output signal whereby the latter signal has variable frequency. It was found that the time of occurrence of a transducer output signal peak and, therefore, the time of a zero crossing of the differentiated signal can be determined with sufficient accuracy only if the signal to be differentiated is differentiated by a frequency selective variable length delay line.

period as elsewhere, it has been the general rule in the past that a delay line in an AC circuit should have constant delay period over the entire frequency range of interest, so that the phase relationship of signal components having different frequencies is maintained throughout passage through the delay line. However, applicant has found that it was the observance of this conventional rule which caused introduction of a significant timing error, i.e., it was found that a fixed length delay line, when used for differentiation, does not reproduce sufficiently accurate spacing between sequential flux transitions because corresponding sequential zero crossings exhibit an inherent timing error as a result of a frequency change in the signal to be differentiated. Moreover, this resulting inaccuracy is superimposed upon the phenomenon of bit crowding and peak displacement distorting the reproduction in the same direction. A delay line, however, exhibiting variable length in the frequency band of readout signal fundamentals reproduces such peak to peak spacing as more accurately timed zero crossings. The reason for this surprising result will be developed more fully below.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 1 illustrates a circuit diagram of a readout circuit improved in accordance with the present invention;

FIG. 2 illustrates, transducer several lines, relevant signals and timing diagrams for FIG. 1, wherein line 2a is a representative example of a digital magnetic recording; line 2b is the corresponding plot of signals resulting from transducer readout of such recording; line 2c is a timing diagram for zero crossings when the signal in FIG. 2b is differentiated by a constant length delay line; and line 2d is the corresponding timing diagram for variable length delay line differentiation; and FIG. 3 illustrates a signal peak with and without delay to explain particular phenomena of delay line differentiation.

As was mentioned above, the invention has general utility, but the preferred environment for employment, and therefore, the preferred embodiment of the invention, is an improved circuit for processing signals which have resulted from readout of magnetically recorded digital signals. Therefore, in FIG. 1 there is shown a magnetic recording surface 10 which may be a tape, drum or disc, a disc being preferred, because the severity of the problems to be solved became evident for high data packing density discs used as rapid access memory in computers. It is assumed that a digital data track is recorded on this recording surface 10 and the track is scanned by a transducer 11 having a double ended output between which an AC voltage develops during relative motion between storage surface and transducer.

In particular, the recording is presumed to be such that digital data are recorded on the magnetic recording surface in a format wherein the direction of magnetic flux changes along the track in representation of the digital data stored on the disc. The particular format of data recording is not important but it is presumed that the magnetic flux changes direction in between saturation in one direction to saturation in a different, usually the opposite direction. These directional changes or transitions occur in an ordered manner but at a rather high and nonuniform rate.

In the so-called frequency doubling or in the Manchester formats, the flux changes direction once per bit frame or bit cell, and an additional directional change, i.e., absence or presence of an additional transition, is of bit valve defining or establishing significance. In general, then, the digital data as recorded on the surface 10 are represented by flux changes, the respective occurrence thereof is of digital significance which, more generally, means that the spatial frequency of occurrence of flux reversals or transitions along the track is of bit rate and bit value defining and/or establishing significance.

As such a recording passes a transducer 11, a voltage peak is induced in the transducer coil for each passing transition and flux reversal. A representative recording is shown in FIG. 2a and the resulting transducer output is plotted in FIG. 2b. The polarity of each voltage peak depends upon the direction in which the flux direction changes. In case of a high bit package density, and for high relative speeds between transducer and storage surface, the output voltage of the transducer is a high frequency signal. The periods during which track portions holding magnetization of particular flux direction passes the transducer is so short that rarely there is a zero output in the transducer other than a traversal of the zero level at a rather steep gradient. But even where saddles occur in the readout signal, seemingly having zero gradient, they can be distinguished from true peaks even after differentiation, by further processing which is not subject of the present invention.

The reproduction of such a recording has, of course, as its primary purpose the reconstruction of the digital data as they have been recorded. For this it is necessary to determine occurrence of sequential transitions. As each transition is represented by a peak in the readout signal, occurrence of such peaks must be detected. As stated above, amplitude strobing of the output signal of the type shown in FIG. 2b to determine occurrence of signal peaks, has been proven to be unsatisfactory and rather susceptible to noise. The other method, which is commonly employed, is called generally "zero crossing" or "crossover detection." For this the signal of the type shown in FIG. 2b is to be differentiated. The differentiated signal crosses zero for each maximum and for each minimum of the readout signal which zero crossing is indicative of the passage of a flux transition zone in the recording past the transducer. The detection of sequential zero crossings of that differentiated signal can, therefore, be used to reconstitute digital data.

The output signal provided by the transducer 11 may be preamplified in an amplifier 12 which is of no consequence, and it is assumed that a voltage develops across a pair of output terminals B of network 12; a representative example of the voltage is the same as plotted in FIG. 2b. As a consequence of reproducing such a recording and assuming the frequency doubling or the Manchester format has been used, this output signal of transducer 11, or amplifier 12, is an AC signal in which segments of one frequency are followed by segments of half that frequency in those cases where a bit frame with additional transition is followed by a bit frame without additional transition in the recording. Therefore, the signal which amplifier 12 tends to develop across its output terminals is a sequence of AC signal segments of two different frequencies. This is the signal to be differentiated. This voltage signal is fed to a differential amplifier 15 of conventional design, and does not require elaboration. The differential amplifier 15 has two output terminals 16 and 17 and tends to develop a voltage between these two terminals which is still a replica of the signal voltage plotted in FIG. 2b.

A delay line 20 having a first end terminal 21 and a second end terminal 22 is connected to amplifier 15. In particular, delay line end terminal 21 is capacitively coupled to output terminal 16 of differential amplifier 15, while the other end 22 of delay line 20 is also capacitively coupled, now to the other output terminal 17 of differential amplifier 15. Each terminal 21 and 22 receives the signal developed at the respective output terminal of the differential amplifier by operation of the input to the latter, plus the inverted delayed output as derived from the other output terminal. From a different point of view, one can say that, for example, terminal 21 receives the signal developed by amplifier 15 at terminal 16, through capacitive coupling, and from that regard the same signal, but delayed, is subtracted.

The delay line 20 is composed of a conventional portion 23 having an inductance with distributed capacitance along the inductance and relative to ground. Such a delay line provides constant delay over a wide range of frequency. A range of interest covers an octave for frequency doubling or Manchester format of the recording per octave is defined by bit rate frequency up to twice that frequency. The delay line section 23 will delay signals in that range by a constant period. In essence, delay line section 23 can be regarded as a conventional constant length delay line.

In accordance with the invention, a capacitor 25 is connected across section 23 to modify the temporal characteristics of the delay line. The capacitor 25 as connected across the delay line section 23 renders the delay period frequency selective so that the delay line has frequency dependent variable length. As a consequence, a lower frequency signal is delayed more than a higher frequency signal. This omission in delay basically introduces a phase distortion, but in this specific instance and for reasons below, this "distortion" has the advantageous effect of more properly defining the time between sequential zero crossings of the voltages developed across terminals 21 and 22.

For further processing, i.e., zero crossing detection, the output terminals 21 and 22 are connected to the input terminals of another differential amplifier 26 which can be considered as a part of a crossover detector 30. A crossover detector of suitable design is disclosed in my copending application Ser. No. 809,586. The circuit operates to produce the desired effect for the following reasons, which are not obvious and require elaboration. As stated, delay line differentiation operates basically in that from a signal a delayed replica thereof is subtracted. The solid line in FIG. 3 is the portion near a peak of a sinusoidal signal having particular frequency. That signal can be interpreted as a constant frequency transducer output having reproduced a transition which is succeeded as well as preceded by transitions in the opposite direction at similar spacing. The dash-dot curve is a delayed replica of that signal and crosses the undelayed trace at time $t_1$.

If the delay is 2D, then $t_1$ is $t_0+D$ where time $t_0$ is the time of occurrence of the undelayed peak. The delay line differentiation thus introduces a constant delay by D into the system which is independent of frequency as long as (1) the delay line has constant length for signals of different frequencies, as is conventional; and (2) there is no change in frequency at or around the signal peak. This, however, is not true where there is a change of frequency in the signal train when a recorded transition produces a readout signal peak at time $t_0$ and is followed by an oppositely directed transition at half the spacing from the preceding transition. In such a case, the readout curve is distorted as indicated by the dashed line, intersecting the dash-dot line at earlier time $t_2$. The time differential $t_1-t_2$ is denoted $\Delta T$, and has value somewhat less 50 percent of D, i.e., somewhat less than 25 percent of delay line delay. 20 percent is a still closer approximation.

In addition, it has to be observed that in a situation where a transition is preceded by a transition at full bit frame spacing but is succeeded by a transition at half bit frame spacing, there is a peak displacement in that the peak representing the particular transition occurs too early. Hence, peak displacement and constant length delay line differentiation distort the timing of the zero crossing to be detected in the same, mutually, reinforcing direction, tending to shorten the longer period (between the present and the preceding transition) and tending simultaneously to extend the shorter period (between the present and the succeeding transition in the assumed situation). The situation is analogous where a half frame time spacing is succeeded by a full frame time spacing.

FIG. 2c illustrates the situation resulting from constant length delay line differentiation of the signals shown in 2b having resulted from reproduction of the recording shown in FIG. 2 a. The vertical arrows point to instants where the constant delay line differentiation produces a zero crossing, and the symbol written next to such arrow shows the respective delay of such zero crossing from the signal peak represented by such zero crossing. The transitions illustrated are marked 0 through 8; T and T/2 respectively denote full and half frame timing.

For reasons above, transitions (and signal peaks) are represented by zero crossings of a constant delay line differentiation occurring at times D after the passage of transitions 0, 1, 3, 4, 5, 7 and 8. Due to a change in frequency (but disregarding bit crowding), constant delay line differentiation produces a zero crossing signal at times $D-\Delta T$ after passage of transition 2 and at time $D+\Delta T$ after transition 6. As a consequence, the frame time period between transitions 1 and 2 is shortened to $T-\Delta T$; (and even more so because of last crowding) so is the full frame time period between transitions 6 and 7. The respectively succeeding half frame periods 2/3 and 5/6 are extended correspondingly to $T/2+\Delta T$ (and additionally because of bit crowding).

In accordance with the invention the delay line to be used has frequency dependent variable length in that lower frequency signals are delayed more than higher frequency components are delayed, i.e., $2D_{34\ D\ 1} > 2D_h$, where the indices respectively refer to lower and higher frequencies. In particular, it shall be assumed that the difference in delay of signals at frame time frequency, and of signals having twice that frequency is approximately equal to the time differential $\Delta T$, introduced above and using in the formula above $D_1$ to $D_h$. In other words, the delay line frequency differential $2D-2D_h$ should be somewhat less than 25 percent of the delay for the lower frequency signal, for an octave frequency range. About 20 percent gives good results. A smaller differential is still an improvement over a constant length delay line. The situation is now as follows:

A transition such as 0, 1, 7, 8, ends is flanked by transitions at full bit frame spacing on either side. These transitions will be reproduced by sinusoidal peaks of symmetrical contour, and the delay line differentiated signal crosses zero at $D_1$ after each of these peaks the transitions 3, 4, and 5 each are flanked on either side by transitions at half bit frame spacing and will be reproduced by sinusoidal peaks where the delay line differentiated signal crosses zero when delayed or $D_h$ ($=D_1-\Delta T$) after the peak. There is then a difference in delays and zero crossing occurrences for high or low constant frequency signals which does not occur at constant delay line differentiation. This, however, is an advantage as will be shown next.

At transition 2, the (long) delayed lower frequency component intersects the undelayed shorter frequency component (as shown in FIG. 3) at the time $D_e-\Delta T$. Hence, the period between reproduced transitions 1 and 2 is shortened to $T-\Delta T$. However, there is no corresponding extension of the reproduced half frame period between transitions 2 and 3. Analogously, the reproduction of transition 6 is an asymmetrical signal where the peak is defined by a preceding higher frequency signal component and by a succeeding lower frequency signal component. Variable delay differentiation produces intersection of the shorter delayed higher frequency component with the undelayed lower frequency component (mirror symmetry to FIG. 3), occurring at a time after transition 6, $D_h+\Delta'T$, where $\Delta'T=\Delta T+$ terms of higher order. Hence, zero crossing of the delay line differentiated signal occurs at about $D_1(=D_h+\Delta T)$ after transition 6. As a consequence, the half frame period between passage transitions 5 and 6 is represented by reproduced zero crossings respectively delayed by $D_h$ and $D_1$ after respective passage, so Transitions 6 and 7 are reproduced by zero crossings delay about equally by Dso that there is no corresponding shortening in the reproduction of this succeeding full frame period T.

It can thus be seen that the variable length delay line produces output signals in which the zero crossings follow each other more accurately at an improvement of about 50 percent over constant delay line differentiation. It can be seen further that the invention is of particular advantage if the signal to be processed varies in frequency over an octave, or even more, as the relative improvement increases with the span of the frequency range of interest.

The invention is not limited to the embodiments described above but all changes and modifications thereof not constituting departures from the spirit and scope of the invention are intended to be included.

I claim:

1. In a circuit for processing signals developed in a transducer upon passage along a magnetic recording surface in which digital data are recorded in a format wherein the spacing between succeeding magnetic flux reversals is of digital significance, the combination comprising:

amplifier means having input terminals connected to the transducer to receive the signal therefrom and having a pair of output terminals receiving the signals through the amplifier means in signal isolation from the input terminals;

a frequency selective variable length delay line means connected across the output terminals; and means connected for deriving a signal from across the output terminals.

2. In the circuit as set forth in claim 1, the delay line comprising a series inductance having two ends, shunt capacitance distributed along the inductance and a capacitor connected across the two ends independently from the shunt capacitance.

3. In the circuit as set forth in claim 1, the last means including a crossover detector connected to the two output terminals.

4. In the circuit as set forth in claim 1, the amplifying means including a differential amplifier having its input terminals connected to the transducer and having output terminals connected to the delay line.

5. In the circuit as set forth in claim 1, the delay line varying in length by less than 25 percent for an octave of frequencies of the transducer output signals.

6. A differentiator circuit for differentiating signals having variable frequency, and being of the type developed by readout transducers comprising:

a differential amplifier having a pair of input terminals connected to receive the signals and having a pair of output terminals in signal isolation from the input terminals;

a delay line having frequency selective variable length and being connected across the output terminals; and means for deriving a signal from between said output terminals.

7. A circuit as set forth in claim 6, the delay line comprising a constant delay period delay line, and circuit means connected to the constant period delay line to render the operative delay period of the delay line dependent upon frequency of signals passing through.

8. A circuit as set forth in claim 7, the delay line comprising a series inductance having two ends, shunt capacitance distributed along the inductance and a capacitor connected across the two ends.

9. In a circuit as set forth in claim 7, the means for deriving a signal including a crossover detector to provide signals representing occurrence of zero voltage between the two output terminals.

10. In a circuit as set forth in claim 7, the delay line varying in length less than about 25 percent for an octave frequency variation of the signals to be differentiated.